3,377,381
N'-(1-NAPHTHYLMETHYL)-N³-AMINOGUANIDINE
AND SALT THEREOF
André L. Langis, St. Laurent, Quebec, Canada, assignor to American Home Products Corporation, New York, N.Y., a corporation of Delaware
No Drawing. Continuation of application Ser. No. 370,078, May 25, 1964. This application Aug. 4, 1967, Ser. No. 658,363
2 Claims. (Cl. 260—564)

ABSTRACT OF THE DISCLOSURE

There are disclosed herein N¹-o-chlorobenzyl-N³-aminoguanidine, N¹-o-chlorobenzyl-N³-methyl-N³-aminoguanidine, N¹-o-chlorobenzyl-N²-methyl-N³-dimethylaminoguanidine, N¹-o-bromobenzyl-N³-aminoguanidine, N¹-o-methylbenzyl-N³-aminoguanidine and N¹-(1-naphthylmethyl)-N³-aminoguanidine. The compounds of this invention are useful as antihypertensive agents and methods for their preparation and use are also given.

---

This application is a continuation of and replacement for my presently copending application, Ser. No. 370,078, filed May 25, 1964, and allowed on May 9, 1967, and now abandoned.

This invention relates to guanylhydrazines.

More particularly, my invention relates to ortho substituted benzylguanylhydrazines and to naphthylmethylguanylhydrazines, their corresponding acid addition salts, and to the processes by which these compounds are prepared.

The compounds of the invention may be represented by the general formula:

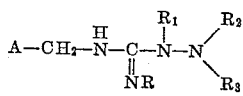

wherein A represents (i) an ortho-substituted phenyl group, the substituent of which is a halogen atom or a methyl group, or (ii) a naphthyl group; R, R₁, R₂ and R₃, which may be the same or different, each represent a hydrogen atom or a methyl group.

The new guanylhydrazines possess hypotensive properties due to selective peripheral sympathetic blockade. These properties depend on the presence of a suitable ortho substituent on the nucleus. The compounds exhibit no para-sympathomimetic properties, a feature of particular advantage when used as antihypertensive agents. They also provide a sustained effect, making them specially useful in the treatment of chronic hypertension. They have the added advantage of not causing local irritation when taken orally.

Compositions suitable for oral administration may be prepared by inclusion of the pharmacologically acceptable salts of the invention with suitable solid carriers. Compositions for injection may be made by incorporating these salts in suitable liquids. Aqueous solutions of the salts are preferred.

Broadly speaking, the new guanylhydrazines of the invention may be prepared by a process selected from the group of processes consisting of (1) Reacting a compound of the formula

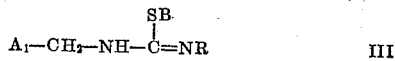

or a salt thereof, with a compound of the formula

and (2) Reacting a compound of the formula

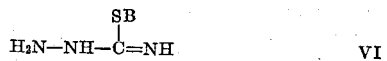

or a salt thereof, with a compound of the formula $$A-CH_2-NH_2 \quad \text{VII}$$

wherein A represents (i) an ortho-substituted phenyl group, the substituent of which is a halogen atom or a methyl group or (ii) a naphthyl group, B represents a lower alkyl group, desirably containing from 1 to 6 carbon atoms, and preferably methyl, A₁ represents an ortho-substituted phenyl group, the ortho substituent of which is a halogen atom or a methyl group and R, R₁ and R₂ and R₃ which may be the same or different, each represent a hydrogen atom or a methyl group.

A preferred procedure according to this invention for preparing compounds of the formula

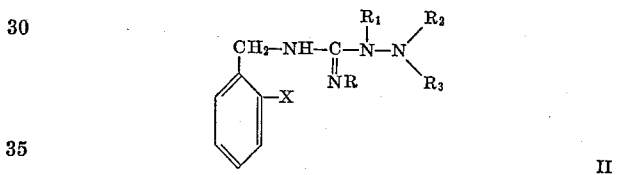

or salts thereof, comprises, reacting a compound of the formula

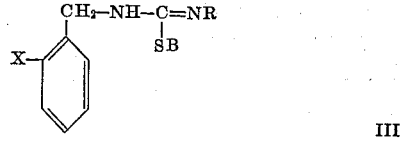

or a salt thereof, with a compound of the formula

wherein X represents a halogen atom or a methyl group, and B, R, R₁, R₂ and R₃ have the above-mentioned meaning.

A modified procedure for the preparation of the guanylhydrazines of the formula

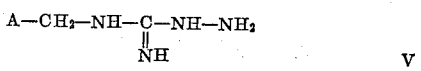

or salts thereof, comprises, the reaction of a compound of the following formula

or a salt thereof, with a compound of the formula

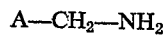

wherein A is as defined above.

The compounds of the above general Formulae III and V, used as starting materials, can be either in the form of their bases or salts. In carrying out the reaction between Compounds III and IV, water or a water-miscible organic solvent is preferably used, for example, isopropanol. Desirably the reaction is carried out at the boiling temperature of the solvent. The reaction between Compounds VI and VII is also preferably carried out in the presence of an inert solvent, for example, water, etc. Compound III, either in its base form or as a salt, used as a starting material, may conveniently be prepared by reacting an ortho-substituted benzylamine hydrochloride, of which the ortho substituent is defined as above, with a reagent of the class effective to convert the amino group to a thiourea group. Preferred reagents for this conversion are sodium isothiocyanate or methyl isothiocyanate. The thiourea obtained is then reacted with an appropriate alkyl compound, for example, methyl halide, etc., to form the alkylisothiourea starting material. The base form of the alkylisothiourea can be obtained by treating the salt with alkali. The alkyl group of the alkyl compound, and thus the alkyl substituent of the alkylisothiourea is preferably lower alkyl, those containing from 1 to 6 carbon atoms being preferred. Shown graphically, a typical process for preparing Compound III is:

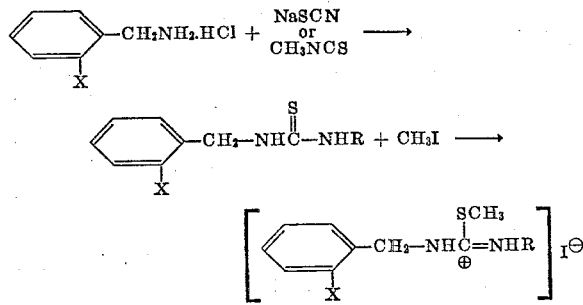

wherein R represents hydrogen or methyl, and X is halogen or methyl.

The Compound VI of the formula

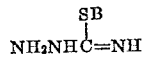

used as one of the starting materials in the alternate process, may be prepared by reacting a thiosemicarbazide with an appropriate alkyl compound, e.g., an alkyl halide to form the S-alkylthiosemicarbazide. The alkyl group of the alkyl compound is preferably lower alkyl, those containing from 1 to 6 carbon atoms being desired. The Compound VI can either be in the form of a salt, or as a free base. Shown graphically, Compound VI may be produced as follows:

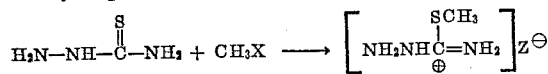

wherein Z represents an anion of an acid.

Having thus generally described the invention, it will now be referred to in greater detail by reference to the following examples, illustrating preferred procedures and reactants, etc.

Example 1.—1-o-chlorobenzylthiourea o-Chlorobenzylamine hydrochloride, 38.0 g. (0.21 mole) and sodium thiocyanate, 17.0 g. (0.21 mole) were refluxed for three hours in toluene (250 ml.). The solvent was evaporated under reduced pressure and the product was crystallized from a mixture of isopropanol and methanol. Yield 21.8 g., M.P. 125–127° C.

Calculated for $C_8H_9ClN_2S$: S, 15.99%. Found: S, 15.99%.

Example 2.—1-o-chlorobenzyl-2-methylthiourea hydriodide 1-o-chlorobenzylthiourea, prepared by Example 1, 21.5 g. (0.11 mole) was dissolved in acetone (150 ml.) and methyl iodide, 15.6 g. (0.11 mole), was added. The solution was stirred at room temperature for ninety minutes and the solvent was evaporated under reduced pressure to one-half the original volume. Ether (150 ml.) was added to the solution which was then cooled. The crystals were collected and recrystallized from an isopropanol and ether mixture. Yield 31.6 g., M.P. 114–117° C.

Example 3.—$N^1$-o-chlorobenzyl-$N^3$-aminoguanidine HCl

Method A.—1-o-chlorobenzyl-2-methylthiourea hydriodide, 10.0 g. (0.029 mole) was dissolved in water (50 ml.) and hydrazine hydrate (1.0 g.) was added. The solution was heated to reflux for two hours and then evaporated to dryness under reduced pressure. The substance was recrystallized from a mixture of isopropanol and ether. Yield 6.6 g., M.P. 128–131° C.

This material was then treated with aqueous alkali, extracted with chloroform and the chloroform was then evaporated under reduced pressure. The residue was dissolved in ethanol and the solution poured in cold ethereal hydrogen chloride. The product was recrystallized from an isopropanol and ether mixture. Yield 5.0 g., M.P. 170–172° C.

The free base of this material was obtained by treating the salt with aqueous alkali and extracting with chloroform. It was characterized by taking an infra-red spectrum—the characteristic bands appearing at 1610 cm.$^{-1}$ and 1655 cm.$^{-1}$.

Calculated for $C_8H_{11}N_4Cl \cdot HCl$: N, 23.82%; Cl, 30.16%. Found: N, 23.48%; Cl, 29.96%.

Method B.—2-methylthiosemicarbazide hydrochloride, 220.0 g. (0.78 mole) was dissolved in water (400 ml.) and o-chlorobenzylamine, 220.0 g. (0.78 mole) was added. The solution was left standing at room temperature for forty-eight hours and then heated on a steam bath for four hours. The solution was cooled and the crystalline material collected and recrystallized from methanol. Yield 127.5 g., M.P. 170–172° C.

Calculated for $C_8H_{11}N_4Cl \cdot HCl$: N, 23.82%; Cl, 30.16%. Found: N, 23.48%; Cl, 29.96%.

Example 4.—$N^1$-o-chlorobenzyl-$N^3$-methyl-$N^3$-aminoguanidine HCl 1-o-chlorobenzyl-2-methylthiourea hydroiodide, 10.0 g. (0.029 mole) was dissolved in a mixture of water (50 ml.) and isopropanol (20 ml.) to which methylhydrazine 1.54 g. (0.029 mole) was added. The reaction mixture was heated to reflux for sixteen hours and then evaporated to dryness under reduced pressure. The residue was crystallized from isopropanol. Yield 6.7 g., M.P. 130–132° C.

The free base of this material was obtained by the same method as described previously. The infra-red spectrum gave characteristic bands at 1630 cm.$^{-1}$, 1605 cm.$^{-1}$, and 1525 cm.$^{-1}$.

This material was converted to the corresponding hydrochloric acid salt by a method similar to the one described previously, M.P. 204–206° C.

Calculated for $C_9H_{13}N_4Cl \cdot HCl$: Cl, 28.47%. Found: Cl, 28.09%.

Example 5.—$N^1$-o-chlorobenzyl-$N^2$-methyl-2-thiourea o-Chlorobenzylamine, 35.4 g. (0.25 mole) was dissolved in water (100 ml.) and methyl isothiocyanate, 18.3 g. (0.25 mole) was added portionwise to the solution which was stirred vigorously. The reaction mixture was heated on a steam bath for one hour and then cooled. The water was decanted and the gummy precipitate was crystallized from an isopropanol and methanol mixture. Yield 41.2 g., M.P. 125–126° C.

Calculated for $C_9H_{11}ClN_2S$: N, 15.6%. Found: N, 15.31%.

Example 6.—$N^1$-o-chlorobenzyl-2,3-dimethylthiourea hydriodide $N^1$-o-chlorobenzyl-$N^2$-methyl-2-thiourea, 41.2 g. (0.19 mole) was dissolved in acetone (200 ml.) and methyl iodide, 28.0 g. (0.19 mole) was added. The solution was stirred at room temperature for one hour. The product crystallized on cooling the solution. The solid was collected and recrystallized from isopropanol. Yield 60.3 g. M.P. 173–175° C.

Example 7.—$N^1$-o-chlorobenzyl-$N^2$-methyl-$N^3$-dimethylaminoguanidine HCl $N^1$-o-chlorobenzyl - 2,3 - dimethylthiourea hydriodide, 10.0 g. (0.028 mole) was dissolved in water (50 ml.) and 1,1-dimethylhydrazine 1.7 g. (0.028 mole) was added. The solution was heated to reflux for five hours and then evaporated to dryness under reduced pressure. The material was then crystallized from isopropanol. Yield 6.7 g., M.P. 130–134° C.

The infra-red spectrum of the free base of this material which was isolated by the method described in Example 3, gave characteristic bands at 3470 cm.$^{-1}$ and 1623 cm.$^{-1}$.

The product was then converted to the corresponding hydrochloric acid salt by the method described previously. M.P. 138–140° C.

Calculated for $C_{11}H_{17}N_4Cl \cdot HCl$: Cl, 25.59%. Found: Cl, 25.86%.

Example 8.—2-methylthiosemicarbazide hydrochloride

Thiosemicarbazide, 409.5 g. (4.5 moles) was dissolved in ethanol (1.125 ml.) and methyl chloride (450 ml.) was added. The mixture was placed in a one-gallon pressure autoclave and heated to 80° C. for sixteen hours. The product was then collected and recrystallized from ethanol. Yield 451.1 g., M.P. 158–159° C.

Calculated for $C_2H_7N_3S \cdot HCl$: Cl, 25.05%. Found: Cl, 25.57%.

Example 9.—$N^1$-o-bromobenzyl-$N^3$-aminoguanidine HCl

2 - methylthiosemicarbazide hydrochloride 7.61 g. (0.054 mole) was dissolved in water (25 ml.) and o-bromo benzylamine, 10.0 g. (0.55 mole) was added. The solution was left standing at room temperature for twenty hours and then heated on a steam bath for four hours. The solution was cooled and the crystals collected. The product was recrystallized from water. Yield 2.2 g., M.P. 171–173° C.

The infra-red spectrum of the free base of this material gave characteristic bands at 1620 cm.$^{-1}$, 1445 cm.$^{-1}$ and 1030 cm.$^{-1}$.

Calculated for $C_8H_{11}N_4Br \cdot HCl$: N, 20.04%; Cl, 12.67%. Found: N, 19.89%; Cl, 12.78%.

Example 10.—$N^1$-o-methylbenzyl-$N^3$-aminoguanidine HCl 2-methylthiosemicarbazide hydrochloride, 22.0 g. (0.156 mole) was dissolved in water (25 ml.) and o-methylbenzylamine, 19.0 g. (0.156 mole) was added. The solution was left standing at room temperature for seventy hours. The product was collected and recrystallized from isopropanol. Yield 7.0 g., M.P. 147–149° C.

The infra-red spectrum of the free base of this material has characteristic bands at 1625 cm$^{-1}$, 1468 cm.$^{-1}$ and 1496 cm.$^{-1}$.

Calculated for $C_9H_{14}N_4 \cdot HCl$: N, 16.52%. Found: N, 16.78%.

Example 11.—$N^1$-(1-naphthylmethyl)-$N^3$-aminoguanidine HCl 2-methylthiosemicarbazide hydriodide, 10.0 g. (0.043 mole) was dissolved in water (25 ml.) and 1-naphthylmethylamine, 6.8 g. (0.043 mole) was added. The solution was left standing at room temperature for forty-eight hours, and then heated on a steam bath for two hours. The solution was cooled and the crystals collected and recrystallized from methanol. Yield 8.0 g., M.P. 183–185° C.

The infra-red spectrum of the free base of this material gave characteristic bands at 1625 cm.$^{-1}$ and 1515 cm.$^{-1}$.

This material was converted to the corresponding hydrochloric acid salt. Yield, 4.38 g., M.P. 151–153° C.

Calculated for $C_{12}H_{14}N_4 \cdot HCl$: Cl, 14.15%. Found: Cl, 14.16.

I claim:
1. $N^1$-(1-naphthylmethyl)-$N^3$-aminoguanidine.
2. $N^1$-(1-naphthylmethyl)-$N^3$ - aminoguanidine hydrochloride.

References Cited

Finnegan et al.: Journal Organic Chemistry, vol. 18, pages 780 and 786 (1953).

McKay et al.: Journal Med. Chem., vol. 6, No. 5, pages 587–95 (1963).

CHARLES B. PARKER, Primary Examiner.

R. V. HINES, Assistant Examiner.